United States Patent
Woodman et al.

(10) Patent No.: US 9,521,398 B1
(45) Date of Patent: Dec. 13, 2016

(54) MODULAR CONFIGURABLE CAMERA SYSTEM

(75) Inventors: Nicholas D. Woodman, Sausalito, CA (US); David A. Newman, San Diego, CA (US); Stephen B. Schmidt, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 867 days.

(21) Appl. No.: 13/437,854

(22) Filed: Apr. 2, 2012

Related U.S. Application Data

(60) Provisional application No. 61/471,193, filed on Apr. 3, 2011.

(51) Int. Cl.
*H04N 13/02* (2006.01)
*G03B 35/00* (2006.01)

(52) U.S. Cl.
CPC .......... *H04N 13/0239* (2013.01); *G03B 35/00* (2013.01)

(58) Field of Classification Search
CPC ............ H04N 13/0239; H04N 5/23245; H04N 13/0289
See application file for complete search history.

(56) References Cited

U.S. PATENT DOCUMENTS

| | | | |
|---|---|---|---|
| 2003/0076413 A1* | 4/2003 | Kanade et al. | 348/139 |
| 2004/0071367 A1* | 4/2004 | Irani et al. | 382/284 |
| 2006/0133695 A1* | 6/2006 | Obinata | G06T 1/60 382/296 |
| 2009/0123144 A1* | 5/2009 | Maezono | G03B 35/00 396/327 |

* cited by examiner

*Primary Examiner* — Zhubing Ren
(74) *Attorney, Agent, or Firm* — Fenwick & West LLP

(57) ABSTRACT

A system and a process configuration generates a unitary rendered image for a video from at least two cameras. The configuration detects a communication coupling of at least two cameras and determines a master camera and a slave camera. The configuration determines an orientation of camera sensor of the master camera and the slave camera and determines a first frame of a video for a synchronization point for a start of a video capture. The configuration captures and reads images from the master camera sensor and the slave camera sensor in response to the start of the video capture and orientation of the camera sensors.

20 Claims, 6 Drawing Sheets

US 9,521,398 B1

MODULAR CONFIGURABLE CAMERA SYSTEM

RELATED APPLICATIONS

This application claims the benefit of U.S. Provisional Application No. 61/471,193 entitled "Modular Configurable Camera System" to Nicholas Woodman, et al. filed Apr. 3, 2011, which is incorporated by reference in its entirety.

BACKGROUND

1. Technical Field

This disclosure relates to a camera system, and more specifically, to a modular configurable camera system for capturing 2D, 3D, panoramic, and/or spherical images and/or video.

2. Description of the Related Arts

In recent years, amateur use of digital cameras has increased dramatically as improvements in digital camera technology have allowed cameras to become more affordable and user-friendly. However, advanced forms of digital photography such as three-dimensional (3D) imaging, panoramic imaging, and spherical imaging have conventionally been available only to professional photographers and filmmakers. Traditionally, 3D photography requires expensive stereoscopic cameras that are often bulky and difficult to use. Similarly, panoramic and spherical photography traditionally requires advanced multi-lens cameras that are not affordable to the amateur photographer or moviemaker. Thus, traditional camera systems fail to cater to the needs of amateur users that want to use their cameras to produce 3D, panoramic and/or spherical images or video.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Figure 1:
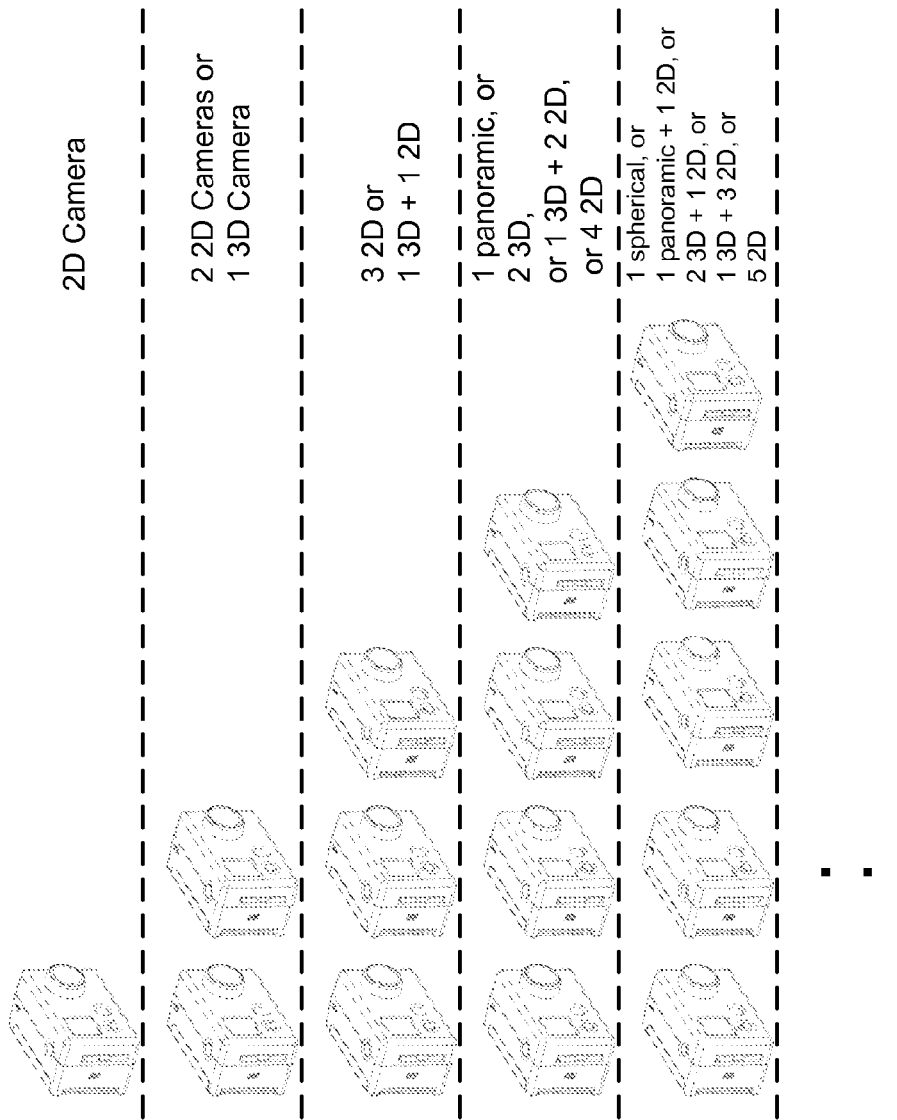
FIG. 1 is a diagram illustrating examples of a variety of possible configurations for a camera system using a varying numbers of cameras.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview of Example Embodiments

In a first example embodiment, a method is provided for capturing video. Two-dimensional (2D) video is captured using a first standalone camera. The first standalone camera is synchronized with a second standalone camera to configure the first and second standalone cameras as a 3D camera. 3D video data is captured using the synchronized first and second standalone cameras. The first and second standalone cameras are then synchronized with third and fourth standalone cameras to configure the first, second, third, and fourth standalone cameras as a panoramic camera. Panoramic video data is then captured using the synchronized first, second, third, and fourth standalone cameras.

In a second example embodiment, a method for capturing three-dimensional video is provided. A first camera detects a communication coupling to a second camera. An orientation of a camera sensor of the first camera is determined as one of an upright orientation or an upside-down orientation. A synchronization signal is received for a start of a video capture on the first camera and the at least one other camera. Video is captured on the first camera responsive to the synchronization signal using the camera sensor. For each frame of video, the camera sensor scans in a first order responsive to the orientation being the upright orientation and the camera sensor scans in a second order different than the first order responsive to the orientation being the upside-down orientation. The captured video is stored to a memory of the first camera.

In a third example embodiment, a camera system comprises at least a first camera, a second camera, and a synchronization interface. The first camera has a 2D capture mode and a 3D capture mode. The first camera captures 2D video when configured in the 2D capture mode and captures a first portion of 3D video when operating in the 3D capture mode. The second camera has a communication interface for communicatively coupling to the first camera. The second camera captures 2D video when configured in the 2D capture mode and captures a second portion of the 3D video when operating the 3D capture mode. The synchronization interface automatically detects a coupling or decoupling of the first camera and the second camera, and configures the first and second camera in the 2D capture mode when the first couple is decoupled from the second camera, and configures the first and the second camera in the 3D capture mode when the first camera is coupled to the second camera.

Modular Camera System

A camera system comprises two or more (i.e., a plurality of) cameras. In a two-dimensional (2D) operating configuration, each of the plurality of cameras can be used in a conventional standalone manner to capture 2D images and/or videos. Furthermore, two or more cameras may be time-synchronized to capture images and/or video in a synchronized manner. This allows a user to capture video of a scene or event from different viewpoints using the different cameras and then later piece together time-localized video segments (i.e., a scene or cut) from different cameras to make a continuous-time 2D movie (e.g., using post-processing movie software).

In a three-dimensional (3D) operating configuration, two or more cameras are communicably coupled together (electrically and/or physically) and synchronized such that the captured images and/or video can be overlaid to create 3D images and/or video. The 3D images and video create the illusion of depth thereby providing the 3D effect. As in the 2D operating configuration, two or more camera pairs may be time-synchronized to capture a 3D scene or event from multiple perspectives, and these scenes may later be compiled into a continuous time 3D movie.

In a panoramic or semi-panoramic operating configuration, a plurality of cameras (e.g., four or more cameras) are communicably coupled together (electrically and/or physically) and synchronized such that the captured images and/or video can be spatially stitched together to create panoramic or partially panoramic images and/or video (e.g., allowing for a 360 degree view). In a spherical or semi-spherical operating configuration, a plurality of cameras (e.g., five or more cameras) are communicably coupled together (electrically and/or physically) and synchronized such that the captured images and/or video can be spatially stitched together to create spherical or partially spherical images and/or video (e.g., allowing for 360 degree views in both the horizontal and vertical planes). Furthermore, by coupling together a plurality of camera pairs configured for 3D capture (e.g., four or more camera pairs), 3D panoramic or 3D spherical images and/or video can be created.

In an array operating configuration, a plurality of cameras (e.g., two or more cameras) are communicably coupled together (electrically and/or physically) and synchronized in order to capture images and/or video an object, point, area, or scene from multiple perspectives. In contrast, to for example, spherical imaging where the cameras are generally oriented outwardly from a center point to capture a spherical viewpoint of the surroundings, the array-based configuration instead orients the cameras towards the center point to capture, for example, images of an object from a variety of different perspectives. These images and/or videos can be post-processed to create, for example, three-dimensional images and/or videos of the object, point, area, or scene.

In one embodiment, each camera may be programmable to a different operating mode depending on the particular configuration in which it will be used. For example, a user may access a program menu to select the appropriate camera configuration on each camera. Alternatively, the configuration could be automatically detected by the camera.

Each individual camera in the camera system can operate as a standalone 2D camera, or can be combined with one or more other cameras to create a camera system for capturing 3D, panoramic, 3D panoramic, spherical, 3D spherical, and/or array-based images and video. Furthermore, a camera or cameras in one configuration (e.g., 2D, 3D, panoramic, 3D panoramic, spherical, 3D spherical, or array-based) may be time-synchronized with other cameras in the same or different configuration to synchronously capture 2D, 3D, panoramic, 3D panoramic, spherical, 3D spherical, and/or array-based image and/or video.

Beneficially, the camera system can be used in a variety of arrangements to capture different types of images and video (e.g., 2D, 3D, panoramic, 3D panoramic, spherical, 3D spherical, and array-based). Thus, for example, a user does not need to purchase separate dedicated 2D, 3D, panoramic, and spherical cameras to capture different types of images and video, nor does the user need to transport multiple different types of cameras to the desired location. The configurations as described herein allows for increasing the functional operations available to a user by adding cameras to a configuration in a cost effective manner.

By way of example, at an event such as a sporting event, a user owning a set of six cameras may wish to first capture panoramic video of the event. To do so, the user first configures the six cameras into the panoramic operating configuration and captures panoramic video of the event. At a later time, the user may wish to capture 3D video of the event from several different locations. To do so, the user then takes the same six cameras and reconfigures them into three pairs of cameras in the 3D operating configuration. The user can then capture 3D video from three different locations using the same six cameras previously used to capture the panoramic video. At another time, the user wishes to capture 2D video from several different locations. Because each of the six cameras also functions as a standalone camera, the user can capture 2D video from up to six different locations using the same six cameras previously used to capture panoramic video and 3D video. At yet another time, the user may orient two or more of the six cameras towards a particular object in order to capture three-dimensional images of the object using an array-based camera configuration. All of the captured content may be stitched together spatially and/or temporally in post-processing to create a wide variety of images and/or videos.

Turning now to FIG. 1, it illustrates varying camera configurations that can be utilized depending on the number of cameras available. As can be seen, the number of available options increases significantly as the number of available cameras increases, thus providing users substantially more flexibility.

The described camera system is particularly desirable to amateur users who may not want to spend money for dedicated 3D, panoramic, or spherical cameras. The modular design furthermore provides great flexibility to the user. For example, with the same set of six cameras (having a total of six lenses), the user can either capture panoramic video, capture 3D video from up to three different locations, capture 2D video from up to six different locations, capture a combination of 3D and 2D video (optionally time synchronized), or capture array-based video of an object or scene. In contrast, using traditional dedicated camera systems, the user would need ten different cameras (six standalone cameras, three 3D cameras, and one panoramic camera) having a total of eighteen lenses to accomplish the same task.

Camera Architecture

Figure 2:
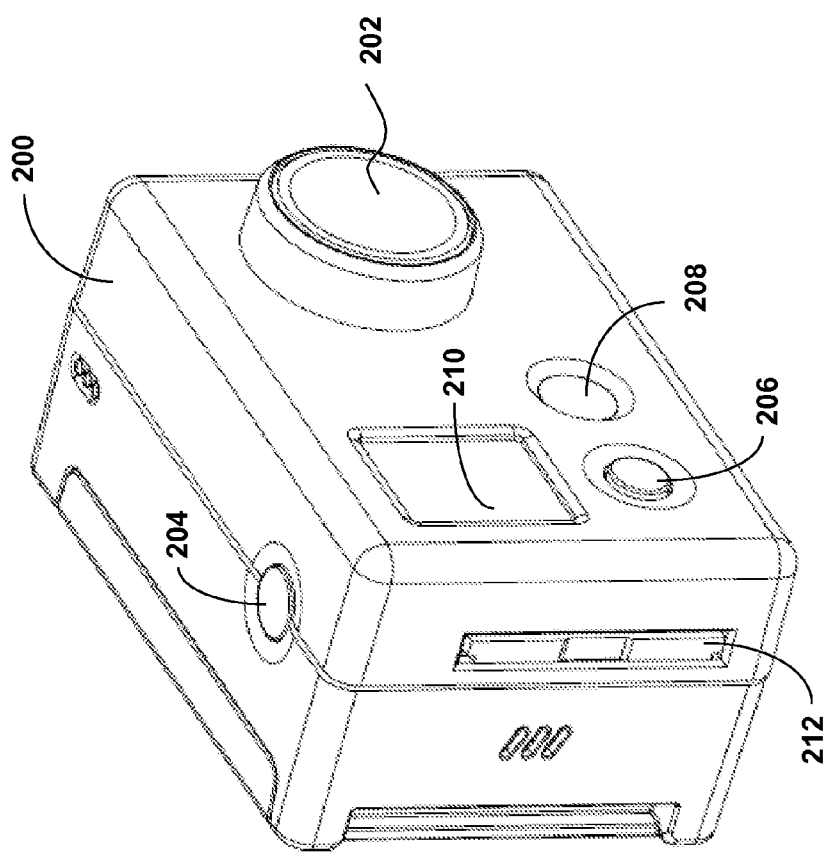
FIG. 2 illustrates an example embodiment of a camera.

Next, FIG. 2 illustrates an example embodiment of a camera 200 for use in the described camera system. In one embodiment, the camera 200 includes a lens 202, a shutter button 204, a function button 206, an indicator light 208, a control display screen 210, and a memory card slot 212. Other conventional camera features not specifically illustrated or described may also be included in the camera 200. For example, each camera 200 may include various optical components, a microphone, speakers, an image and/or audio processor, a controller, internal storage (e.g., flash memory, disk, memory cache or the like), an image preview display screen, input/output ports (e.g., USB, IEEE-1394, Bluetooth, or the like) a communications module (e.g., WiFi or mobile communication such as 3G, 4G, LTE or the like) and other conventional camera components. Furthermore, each camera 200 may include different or additional control inputs for capturing images and/or videos and control buttons for viewing previously captured images and/or videos and managing various function settings.

In addition to conventional camera components, each camera 200 also includes a communication interface for communicating with one or more other cameras. The communication interface allows a camera 200 to connect or pair with one or more other cameras via a wired or wireless interface. For example, in the 3D operating configuration, two (or more) cameras are coupled via their respective communication interfaces. In the panoramic or spherical operating configuration, four or more cameras may all be coupled via their respective communication interfaces.

In one embodiment, a camera 200 can be configured to operate in either an upright mode or an upside-down mode relative to a top of the camera 200 (e.g., where the shutter button 204 is located). In the upright mode (e.g., shutter button 204 facing upward in the example camera 200 configuration illustrated in FIG. 2), the orientation of the captured images/video matches what a user would see through the viewfinder (i.e., the orientation is not flipped). In the upside down mode (e.g., the side opposite the shutter button facing upward and the side having the shutter button 204 is facing downward), the stored image/video is flipped about the horizontal axis (i.e., upside down relative to what a user would see through the viewfinder). This allows the camera 200 to capture images and/or video that is properly oriented even when the user turns the camera upside down. In one embodiment, the orientation of the camera is detected automatically by an orientation sensor of the camera. Alternatively, the orientation may be manually programmed by a user of the camera.

In one embodiment, each individual camera 200 in the camera system has a small form factor (e.g., a height of approximately 4 to 6 centimeters, a width of approximately 5 to 7 centimeters, and a depth of approximately 2 to 4 centimeters), and is lightweight (e.g., approximately 50 to 150 grams). Such individual camera configuration provides an additional system flexibility as further described herein. For example, coupling the individual cameras as described herein creates a new and different camera system, which can function as a new apparatus.

2D (Standalone) Camera Configuration

In the 2D operating configuration, each camera functions like a standalone digital camera. When optionally synchronized, multiple cameras can simultaneously capture video in a time-synchronized manner. In one embodiment, the cameras communicate using a master/slave (or primary/secondary) configuration in which one camera operates as the master and one more additional cameras operate as slaves. In this configuration, the master camera sends various commands to the slave cameras. For example, the master camera may send a command that instructs each of the slave cameras to take a picture or begin recording video at a particular time (e.g., predefined instance) or at a specific event (e.g., a specific event within the camera such as capture of a first frame of video). Furthermore, the master camera may configure various settings of the slave cameras such as, for example, frame rate, exposure time, resolution, color, and any other operating parameters to ensure that the cameras record video or images using the same setting.

Alternatively, a separate remote control device may be used to synchronously control a plurality of cameras. For example, the remote control device may send commands instructing each camera to take a picture or begin/stop recording video. In one embodiment, the remote control device can be a smartphone executing an application for controlling the cameras.

Since each of the cameras may be identical, in one embodiment, any camera can be configured as either a master or slave (e.g., using a physical switch or a software setting). For video, the cameras are time-synchronized to ensure that each of the synchronized cameras initializes video capture at the same time. Furthermore, for video, the slave camera's clocks are periodically re-synchronized with the master camera's clock in order to re-synchronize the cameras and compensate for potential draft due to different internal camera clock characteristics. In one embodiment, captured images or video are wireless streamed to a remote device for live viewing. For example, in one embodiment, the remote device comprises a smartphone executing an application for receiving and viewing the live streaming video. Alternatively, the remote device may comprise a dedicated preview device. Each camera may also record and store their respective data locally.

In various embodiments, the cameras may communicate with each other and/or with one or more remote devices via any wired or wireless communication interface such as, for example, Universal Serial Bus (USB), Wifi, Bluetooth, or a cellular network such as a 3G network or a 4G network.

3D Camera Configuration

In the 3D operating configuration, two or more cameras are communicably coupled and synchronized to capture images and/or video that can then be stitched together to create 3D (or stereoscopic) images or video. Unlike current techniques which utilize specialized 3D cameras having two fixed position lenses that can capture 3D images having a fixed depth, the 3D camera configuration described herein uses two or more standalone cameras that can be moved with respect to each other to vary the distance between the lenses and capture multiple 3D images having varying depths. Furthermore, because the 3D camera configuration described herein does not require expensive special-purpose 3D cameras, the described embodiments provide both a flexible and low cost solution.

Figure 3:
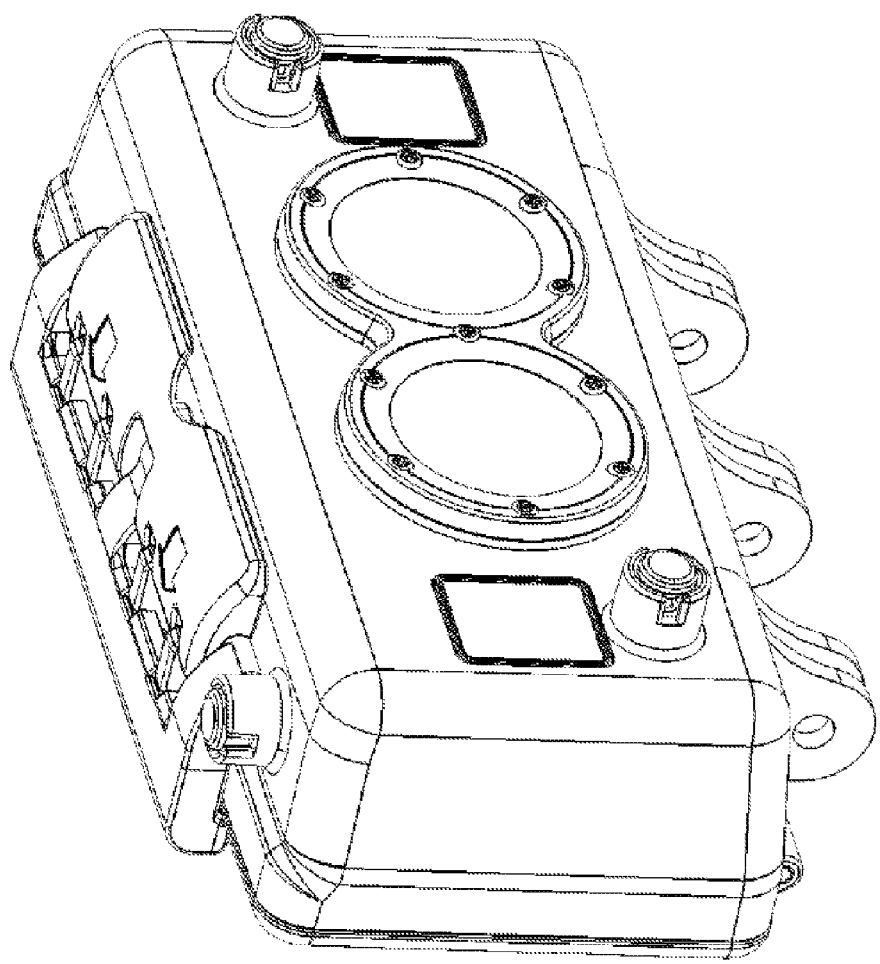
FIG. 3 illustrates an example embodiment of a camera housing for two cameras.

In one embodiment, a camera housing or mounting structure provides a physical coupling between cameras configured in the 3D operating configuration. FIG. 3 illustrates one example embodiment of a housing for two cameras, e.g., cameras 200, enabling 3D image/video capture. Although a camera body itself may be used in the configurations described, in alternate embodiments the configurations include a separate camera housing. For purposes of description, a camera housing is described but the principles apply to other camera body configurations that may not include the separate housing.

Returning to the example of FIG. 3, the housing may be, for example, a clear rigid housing structured to secure two cameras. Furthermore, the housing may be structured such that when the cameras are inserted into the housing, their lenses are positioned at an appropriate distance for capture of 3D images and/or video. For example, in one embodiment this lens distance is achieved by the housing securing a first camera, e.g., 200, in an upright position and a second camera, e.g., also 200, in an upside down position within the housing.

In one embodiment, the camera housing is rigid (or substantially rigid) (e.g., plastic, metal, fiberglass, etc.) In one embodiment, the camera housing may be appropriately configured for use in various elements. For example, the camera housing may comprise a waterproof enclosure that protects the camera from water when used, for example, while surfing or scuba diving. Furthermore, in one embodiment, a wired or wireless electrical coupling is built into the 3D camera housing such that when two cameras are inserted into the housing, the appropriate electrical connections are made between them in order for the cameras to be appropriately synchronized for 3D image or video capture as further described herein.

In one embodiment, the housing is configured to allow the distance between the 2 or more lens to change during the video capture. For example, in one embodiment, the housing allows the cameras to move along the horizontal axis through the center of the lenses of the cameras, thus varying the distance between the camera lenses.

As noted previously, in one embodiment of the 3D camera configuration, the camera housing is configured to house a first camera in an upright position and house a second camera in an upside-down position relative to the first camera. For cameras having lenses offset to one side (as in the camera 200 of FIG. 2), this housing configuration enables the lenses of the two cameras to be positioned close together and symmetrically distant from a center line of the housing. The camera modes may also be automatically configured based on the camera orientation. For example, in this specific embodiment, the upside down camera will be automatically configured to operate in the upside-down mode. This ensures that images/videos captured from both cameras in the housing are oriented in the same direction even though one of the cameras is upside-down.

To create (or generate) a 3D image, two images or sets of video are captured, one from each of two cameras. As used herein, a pair of cameras used in this manner may be collectively referred to as a "3D camera." The camera lenses of the camera pair are positioned such that large portions of the captured image/video spatially overlap. Using image processing software, the images or video frames are stitched together to create the 3D images or videos. In various embodiments, the image processing software may be post-processing software or may operate in real-time as the cameras capture video or images. Images or video from the different cameras could be wirelessly streamed to a remote device for storing or live viewing (for 3D capture or otherwise). In one embodiment, the 3D video or images are designed for viewing using special 3D viewing glasses (e.g., red/green, red/blue, polarized, active shutter, or other type of glasses). In one embodiment, two or more 3D cameras (each comprising two synchronized cameras) can be time-synchronized in the manner described above. This would allow, for example, a user to capture a scene or event from multiple perspectives and later create a continuous 3D movie made up from the various scenes or cuts.

In one embodiment, a 3D camera configuration comprises three or more standard cameras (such as camera 200). The three or more cameras are all synchronized to concurrently capture images or video of the same object or scene. In post-processing, multiple 3D images or video can be constructed from different pairs of the three or more cameras, each having different depths of field based on the distance between the cameras in each camera pair.

Figure 4:
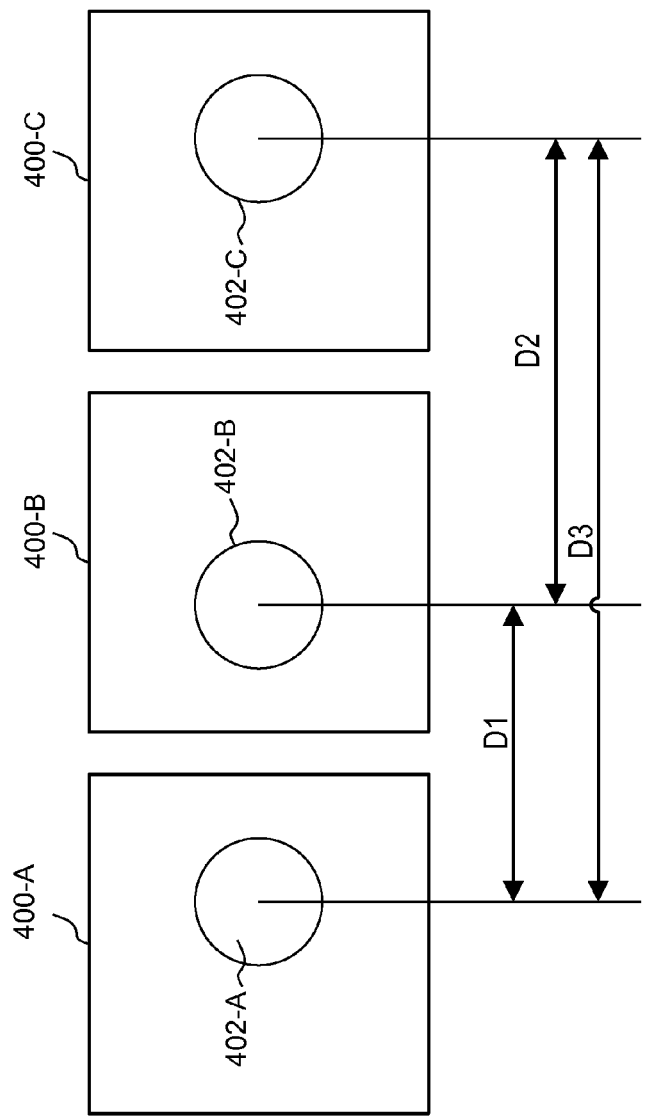
FIG. 4 illustrates an example 3D camera configuration for capturing images and/or video of varying depth.

FIG. 4 provides an example illustration for a case where three cameras 400-A, 400-B, 400-C are used. The cameras are positioned such that there is a distance D1 between a lens 402-A of camera 400-A and a lens 402-B of camera 400-B, and a distance D2 between the lens 402-B of camera 400-B and a lens 402-C of camera 400-C. As a result, there is also a distance D3 between the lens 402-A of camera 400-A and the lens 402-C of camera 400-C. These distances D1, D2, D3 are one parameter that defines the different depths of field for 3D content that could be generated from the images or video captured by camera 400-A, 400-B, and 400-C. Thus, using three camera 400-A, 400-B, 400-C, three different pairs of cameras are possible with each pair having a different distance between lenses, and each pair capturing images or video that can be combined to create 3D images or video having different depths of field.

In one particular configuration, cameras 400-A and 400-C may be oriented and configured in the upright position while camera 400-B is oriented and configured in the upside down position. Assuming the camera bodies are spaced roughly equally apart and the cameras have offset lenses, the distances D1, D2, and D3 will all be different. This ensures that three different depths of field are captured using only the three cameras 400-A, 400-B, 400-C. Thus, the offset (i.e., not centered) lens camera 200 of FIG. 2 allows for the possibility of creating three different depth of views using the minimum number of cameras.

While FIG. 4 illustrates an example with only with 3 cameras, the concept can be extended to any number of cameras, e.g., as described with FIG. 1, thus allowing for an even greater number of possible camera pairings, and enabling capture of additional 3D images/videos or varying depths. In one embodiment, the distances between cameras could also be adjusted over time to create more possible 3D images with different depths without requiring additional cameras.

Typically, all of the cameras used in any of the 3D camera configurations described above are synchronized with each other. This control connection may be implemented via wired or wireless solution. In one embodiment, the connection is done via a wireless module coupled to each camera or a wired connection between them, which allows for any type of synchronization. The wireless module may enable communication via protocols such as Wifi, Bluetooth, or cellular network-based communication (e.g., a 3G or 4G cellular network). In one embodiment, a first camera acts as a master camera and the other cameras act as slaves. In one embodiment, prior to image or video capture, the master camera retrieves various image capture settings sends commands to the slave camera(s) to configure various settings and synchronize image capture. For example, the master camera may send commands to control each of the cameras to achieve similar picture quality, field of views, mode and speed. In one embodiment, this synchronization may occur automatically when a user pushes a shutter button on one of the cameras to capture an image or being capturing video. The master camera may periodically check its settings for changes, and transmits any changes to the slave cameras. The slave cameras then update their settings to match the master camera.

The cameras are also configured to ensure that they remain synchronized with each other for video capture. In one embodiment, the frame rate and timing of video capture is based off of a clock of the master camera, which serves as the master clock. Prior to beginning video capture, the master and slave cameras perform a handshaking process to ensure that they all begin capturing video at the same time, synchronized with the master clock. Moreover, agreement in this process may include identifying a particular first frame in which to begin synchronization.

In one embodiment, a synchronization interface automatically detects when two cameras (e.g., a first camera and a second camera) are communicatively coupled or decoupled. When the two cameras are coupled together, the synchronization interface configures the camera in the 3D capture mode described above. When the cameras are decoupled, the synchronization interface configures the cameras in the 2D standalone capture mode. In one embodiment, the synchronization interface is a component of the first or second camera (e.g., the master camera).

For video, it is desirable that the first frame be captured at the same time by each camera. To create the 3D effect, the frames from each camera must be captured within a very short time of each other. If the delay is too long, the images may not match (e.g., due to movement of the subject) and the quality of the 3D effect may be compromised. Thus, in one embodiment, a camera synchronization process is employed to ensure that each camera uses identical setting parameters, begin capturing the first frame of video at the same time, and remain synchronized throughout video capture.

During video capture, the clocks of the various cameras may drift due to different clock characteristics. To remedy this problem, the master camera may periodically send out synchronization burst to the slave cameras, and the slave cameras re-synchronize themselves to the master clock. For example, in one embodiment, frames are synchronized to ensure that each camera captures a frame within 10 ms of each other.

Figure 5:
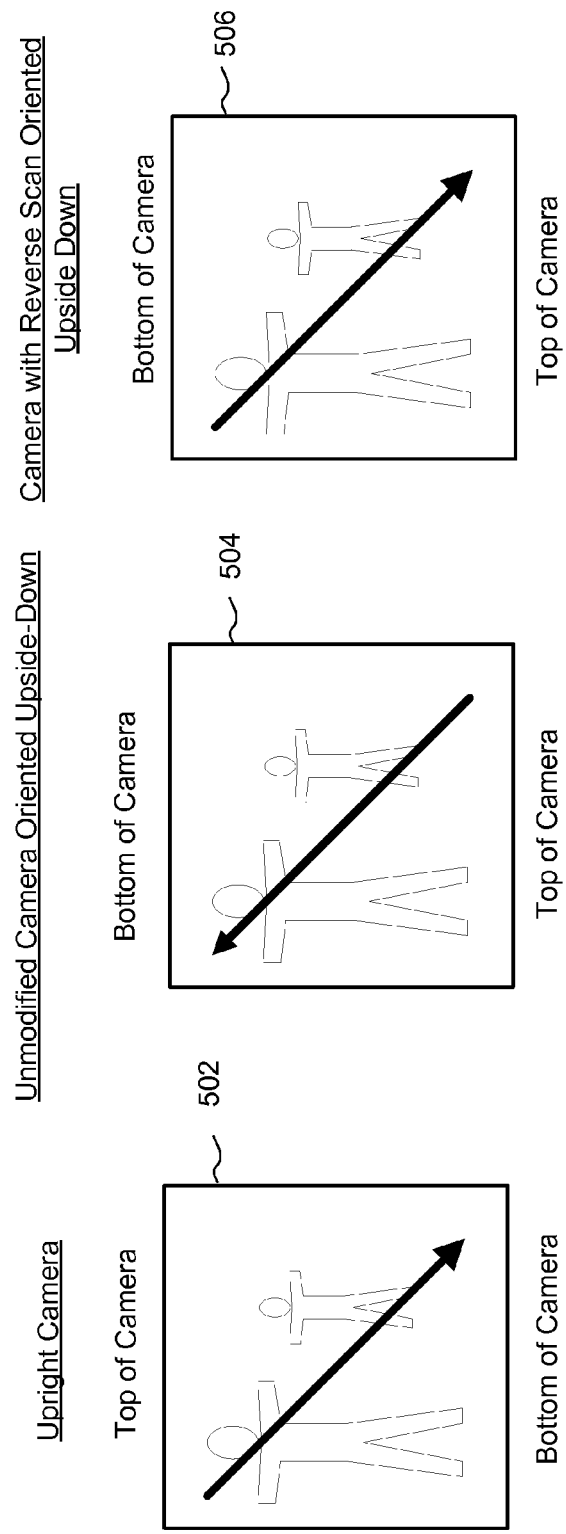
FIG. 5 illustrates an example embodiment of an image or video capture technique using a reverse scan feature.

As described above, it may be desirable to operate a camera in either an upright position or an upside down position (e.g., to allow a camera 200 of FIG. 2 to operate within a housing of FIG. 3). Synchronization between an upright camera and an upside-down camera presents the additional challenge of accounting for pixel delay between when corresponding pixels are captured between the two cameras. The pixel delay problem is illustrated in FIG. 5. Many digital cameras do not capture all of the pixels of an image or video frame at exactly the same time, but rather, captures the pixels in a raster scan order. For example, a camera in an upright orientation captures an image 502 by scanning left to right across the top row of the scene, then left to right across the next row below, and so on traversing the rows from top to bottom. A traditional camera turned upside down captures the image 504 of the same scene with the image capture initiated at the same time as capture of image 502. However, without further modification, the image 504 will be scanned right to left across the bottom row, then right to left across the next row above, and so on traversing the rows from bottom to top because the camera is upside-down. Thus, corresponding pixels of the image 502 and the image 504 will be captured at slightly different times because capture of image 502 begins at the top and capture of image 504 begins at the bottom. While this delay is generally very short relatively short, the gap may be sufficient to be observable in the case of very fast moving objects and may create visual artifacts if images 502 and 504 are combined to create a 3D image.

To alleviate the above-described problem, a camera as described herein may be equipped with a reverse scan feature that automatically configures the camera to scan in the reverse direction when in the upside-down mode. With the reverse scan feature, a camera oriented upside-down will capture image 506 by performing a raster scan in the same direction (thus capturing pixels in the same order) as the upright camera captures image 502 (i.e., from left to right and top to bottom). Thus, for any given pixel in image 502 (captured by the upright camera), the corresponding pixel in image 506 (captured by the upside-down camera) will be captured at substantially the same time. This reduces or eliminates the artifacts resulting from pixel delay, as the reverse scan ensures that corresponding pixels are captured at substantially the same time between the upright and the upside down cameras.

In an alternative embodiment, an independent master control module that is not necessarily a camera (e.g., embodied in an electronic device such as a smartphone) is coupled to each of the cameras and acts as the master to send control and/or synchronization signals in any of the embodiments described above. In this embodiment, each of the cameras act as slaves.

In one embodiment, the cameras also ensure that their respective orientations are consistent (e.g., the cameras are each oriented such that their respective vertical axes are parallel to within some tolerance range). This alignment ensures that the images are aligned and allows for quality 3D image synthesis.

In one embodiment, during capture or during post-processing, a distance may be calculated between the camera and an object visible in the captured images or video. This distance, may be stored as metadata together with the images or video. For example, when capturing video in a vehicle during a race, the distance between the camera and the vehicle in front of it may be stored together with the video and viewable by viewers of the video.

Figure 6:
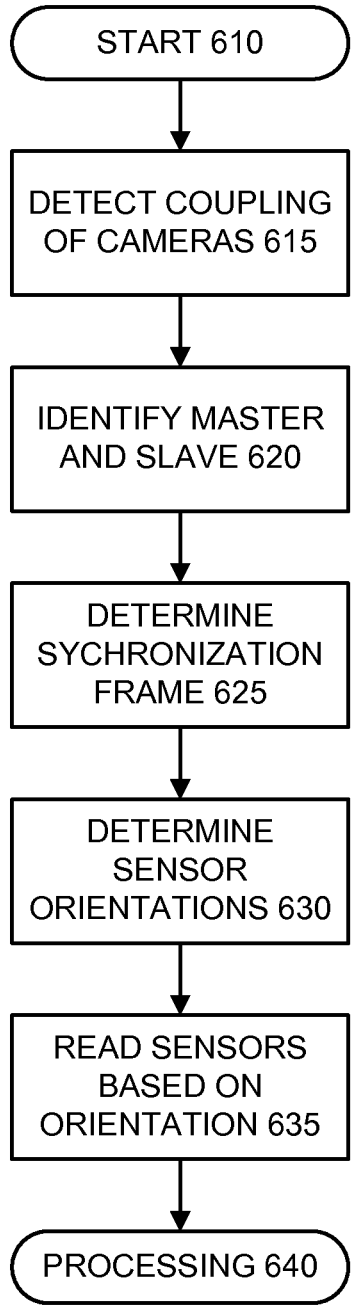
FIG. 6 illustrates a flow chart for an example process for processing images for 3D image capture.

Referring to FIG. 6, it illustrates a flow chart for an example process for processing images for 3D image capture. The example process may be embodied in software or firmware and comprise instructions stored within a computer readable storage medium, e.g., a volatile memory such as a random access memory or non-volatile memory (NVM) such as a disk drive or a NVM solid state memory such as Flash memory within a camera, e.g., camera 200. Further, the instructions are executable by a processor (or controller) within the camera (e.g., camera 200) to carry out the functionality as described.

In this example, the process starts 610 and detects 615 a coupling of two or more cameras, e.g., cameras 200. The detection may occur as a result of a hard-wired connection such as a wired coupling between the cameras. Alternately, the detection may occur as a result of a wireless communication coupling between the cameras. Further, either the wired or wireless coupling may result in a trigger or generation of a bit or set of bits corresponding to notification of the coupling for the process and may be in conjunction with an existing communication protocol or provide for a new communication protocol.

With the coupling detected, the process determines 620 which camera will be a master and which will be a slave (or whether a separate non-camera device is the master). In particular, in one embodiment, the determination may be through a handshaking negotiation between the devices as previously described. Further the determination may also be based on a predetermined identification of which camera will be a master and which will be a slave, e.g., through a software selection within one or more of the cameras. The process also determines in one embodiment an event on which to synchronize. For example, it determines 625 a capture of a particular synchronization frame, e.g., first frame, by the master camera.

In addition, the process determines 630 an orientation of sensors within the cameras. For example, one sensor within a camera may be determined to be in an upright position and another sensor in another camera may be determined to be in an upside down position. As previously described orientation of the sensors determines how images captured are read and processed 635 relative to the coupled cameras.

The read and captured images are further processed 640 for generation of an image, e.g., in 3D or other image configuration as described throughout the disclosure. For example, the captured images may be processed to generate a unitary rendered image for a video relative to a viewer based on the coupling of two more cameras coupled together and configured as described.

It is noted that the images captured by each camera may be stored within the particular camera capturing the image itself or it may be transferred into storage elsewhere, e.g., storage in the cloud. Further, it is noted that the order of the steps noted in the process is not necessarily serial in order and in a specific order. The process may have steps occur in parallel, partially parallel, and/or in order differing from what is illustrated in the example.

Panoramic or Spherical Camera Configuration

In the panoramic or spherical operating configuration, multiple cameras (e.g., four or more cameras) are communicably coupled and synchronized (collectively referred to as a panoramic or spherical camera) to capture images and/or video that can then be stitched together to create the panoramic or spherical images or video.

In the panoramic or spherical operating configuration, a housing or mounting structure may be used that is structured such that when the cameras are inserted into the housing or mounting structure, their lenses are positioned at appropriate distances for capturing panoramic or spherical images and video. Furthermore, an electrical backbone may be built into the mounting structure such that when the cameras are physically connected to the structure, the appropriate electrical connections are made to synchronize the cameras for panoramic or spherical image or video capture.

As in the 3D configuration described above, one of the cameras of the camera group may act a master camera and the remaining cameras act as slaves. Alternatively, an independent control module (e.g., a non-camera module such as a smart phone) may act as the master for the frame synchronization and setting. In this embodiment, all of the cameras act as slaves. As each camera points to a different direction, the desired setting for each camera to take a good picture may be different. The master (camera or independent control module) sends commands to the slave cameras to configure various settings and synchronize image capture. Each camera sends their settings to the master. The master then defines the appropriate setting for each cameras. Thus, multiple sets of images or video are captured, one from each of the cameras. The camera lenses are positioned such that each camera faces a different direction. For example, in one embodiment, four cameras are used to capture panoramic images or video with the cameras aligned on a horizontal plane and oriented to 0°, 90°, 180°, and 270° respectively. In another embodiment, six cameras are used to capture panoramic images with the cameras aligned on a horizontal plane and oriented to 0°, 60°, 120°, 180°, 240°, and 300° respectively. In another embodiment, a pair of cameras coupled in a 3D capture configuration may be oriented in each direction to capture 3D panoramic images or video. In another embodiment, to capture partially spherical video, an additional camera (or camera pair for 3D capture) is added to the panoramic arrangement described above with the lens oriented perpendicular to the horizontal plane. Optionally, to capture fully spherical video, another camera (or camera pair for 3D capture) is added to the partially spherical arrangement described above with the lens oriented perpendicular to the horizontal plane and oriented 180° from the upward facing camera or camera pair. Generally, the captured image/video from each of the cameras at least partially overlap with the image/video of neighboring cameras. In one embodiment, captured images or video could be wireless streamed to a remote device for storing or live viewing. Using post-processing or real-time image processing software, the images are stitched together to create the panoramic or spherical images or videos.

Array-Based Camera Configuration

In the array-based operating configuration, multiple cameras (e.g., two or more cameras) are communicably coupled and synchronized (collectively referred to as an array camera) to capture images and/or video that can then be stitched together to create the array-based images or video such as three-dimensional images/videos of an object.

As in the 3D configuration described above, one of the cameras of the camera array may act a master camera and the remaining cameras act as slaves. Alternatively, an independent control module (e.g., a non-camera module such as a smart phone) may act as the master for the frame synchronization and setting. In this embodiment, all of the cameras act as slaves. In one embodiment, the master (camera or independent control module) sends commands to the slave cameras to configure various settings and synchronize image capture. Each camera sends their settings to the master. The master then defines the appropriate setting for each cameras. Thus, multiple sets of images or video are captured, one from each of the cameras. The camera lenses are positioned such that each camera faces towards a particular focal point or area (e.g., an object or scene). In one embodiment, captured images or video could be wireless streamed to a remote device for storing or live viewing. Using post-processing or real-time image processing software, the images are stitched together to create, for example, three-dimensional images and/or video of the object, point, area, or scene that is the focus of the camera array.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a modular configurable camera system as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope.

The invention claimed is:

1. A method for capturing a video corresponding to a first channel of three-dimensional content, the method comprising:
   determining an orientation of a camera sensor of a first camera as one of an upright orientation or an upside-down orientation, wherein in the upright orientation, a top side of the first camera is above the bottom side of the first camera with respect to a scene, and wherein in the upside-down orientation, the top side of the first camera is below the bottom side of the first camera with respect to the scene;
   initiating capture of the video on the first camera in response to receiving a synchronization signal, the video comprising a sequence of frames, each frame comprising an array of pixels;
   for each frame of the video, sequentially capturing by the camera sensor, pixels representing the scene in a first scan order responsive to the determined orientation being the upright orientation, wherein sequentially capturing the pixels representing the scene in the first order comprises sequentially capturing rows of pixels in an order from the top side of the first camera to the bottom side of the first camera and capturing each row of pixels by sequentially capturing pixels in an order from a left side of the first camera to a right side of the first camera;
   for each frame of the video, sequentially capturing by the camera sensor, the pixels representing the scene in a second scan order responsive to the determined orientation being the upside-down orientation, wherein sequentially capturing the pixels representing the scene in the second order comprises sequentially capturing rows of pixels in an order from the bottom side of the first camera to the top side of the first camera, and capturing each row of pixels by sequentially capturing pixels in an order from the right side of the first camera to the left side of the first camera; and
   storing the captured video of the first camera to a first memory of the first camera.

2. The method of claim 1, wherein the synchronization signal is received from a master control module, the master control module comprising an electronic device independent of the first camera.

3. The method of claim 1, further comprising:
   configuring the first camera as a master camera to provide the synchronization signal to a second camera configured as slave camera, the second camera to capture a second channel of the three-dimensional content.

4. The method of claim 3, further comprising:
   configuring the first camera as the master camera responsive to the determined orientation being the upright orientation and configuring the first camera as the slave camera responsive to the determined orientation being the upside-down orientation.

5. The method of claim 3, wherein the second camera is in the upside-down orientation when the first camera is in the upright orientation and wherein the second camera is in the upright orientation when the first camera is in the upside-down orientation.

6. The method of claim 3, wherein the first and second cameras are each oriented along horizontal axes that are within a tolerance range of each other.

7. The method of claim 3, wherein the first camera comprises:
   a camera body;
   a lens;
   a front face of the camera body, the lens positioned at an offset from a center plane of the front of the camera body; and
   a communication interface for communicatively coupling to the second camera.

8. The method of claim 1, further comprising:
   calculating a distance to an object from the first camera; and
   storing the distance as metadata together with the captured video.

9. The method of claim 1, wherein more than one additional camera is communicatively coupled to the first camera.

10. A non-transitory computer-readable storage medium storing instructions for capturing a video corresponding to a first channel of three-dimensional content, the instructions when executed by a processor causing the processor to perform steps including:
   determining an orientation of a camera sensor of a first camera as one of an upright orientation or an upside-down orientation, wherein in the upright orientation, a top side of the first camera is above the bottom side of the first camera with respect to a scene, and wherein in the upside-down orientation, the top side of the first camera is below the bottom side of the first camera with respect to the scene;
   initiating capture of the video on the first camera in response to receiving a synchronization signal, the video comprising a sequence of frames, each frame comprising an array of pixels;
   for each frame of the video, sequentially capturing by the camera sensor, pixels representing the scene in a first scan order responsive to the determined orientation being the upright orientation, wherein sequentially capturing the pixels representing the scene in the first order comprises sequentially capturing rows of pixels in an order from the top side of the first camera to the bottom side of the first camera and capturing each row of pixels by sequentially capturing pixels in an order from a left side of the first camera to a right side of the first camera;
   for each frame of the video, sequentially capturing by the camera sensor, the pixels representing the scene in a second scan order responsive to the determined orientation being the upside-down orientation, wherein sequentially capturing the pixels representing the scene in the second order comprises sequentially capturing rows of pixels in an order from the bottom side of the first camera to the top side of the first camera, and capturing each row of pixels by sequentially capturing pixels in an order from the right side of the first camera to the left side of the first camera; and
   storing the captured video of the first camera to a first memory of the first camera.

11. The non-transitory computer-readable storage medium of claim 10, wherein the synchronization signal is received from a master control module, the master control module comprising an electronic device independent of the first camera.

12. The non-transitory computer-readable storage medium of claim 10, the instructions when executed further causing the processor to perform a step of:
configuring the first camera as a master camera to provide the synchronization signal to a second camera configured as slave camera, the second camera to capture a second channel of the three-dimensional content.

13. The non-transitory computer-readable storage medium of claim 12, the instructions when executed further causing the processor to perform a step of:
configuring the first camera as the master camera responsive to the determined orientation being the upright orientation and configuring the first camera as the slave camera responsive to the determined orientation being the upside-down orientation.

14. The non-transitory computer-readable storage medium of claim 12, wherein the second camera is in the upside-down orientation when the first camera is in the upright orientation and wherein the second camera is in the upright orientation when the first camera is in the upside-down orientation.

15. The non-transitory computer-readable storage medium of claim 12, wherein the first and second cameras are each oriented along horizontal axes that are within a tolerance range of each other.

16. The non-transitory computer-readable storage medium of claim 10, the instructions when executed further causing the processor to perform a step of:
calculating a distance to an object from the first camera; and
storing the distance as metadata together with the captured video.

17. A camera comprising:
an orientation sensor to determine an orientation of the camera as one of an upright orientation or an upside-down orientation, wherein in the upright orientation, a top side of the camera is above the bottom side of the camera with respect to a scene, and wherein in the upside-down orientation, the top side of the camera is below the bottom side of the camera with respect to the scene;
a synchronization interface to initiate capture of the video on the camera in response to receiving a synchronization signal, the video comprising a sequence of frames, each frame comprising an array of pixels;
an image sensor to capture the video in response to the synchronization signal, wherein for each frame of the video, the image sensor sequentially captures pixels representing the scene in a first scan order responsive to the determined orientation being the upright orientation, and wherein for each frame of the video, the image sensor sequentially captures the pixels representing the scene in a second scan order responsive to the determined orientation being the upside-down orientation, wherein sequentially capturing the pixels representing the scene in the first order comprises sequentially capturing rows of pixels in an order from the top side of the first camera to the bottom side of the first camera and capturing each row of pixels by sequentially capturing pixels in an order from a left side of the first camera to a right side of the first camera, and wherein sequentially capturing the pixels representing the scene in the second order comprises sequentially capturing rows of pixels in an order from the bottom side of the first camera to the top side of the first camera, and capturing each row of pixels by sequentially capturing pixels in an order from the right side of the first camera to the left side of the first camera; and
a memory to store captured video of the first camera.

18. The camera of claim 17, wherein the synchronization interface is configured to receive the synchronization signal from a master control module comprising an electronic device independent of the camera.

19. The camera of claim 17, wherein the camera is configured as a master camera, and wherein the synchronization interface furthermore provides the synchronization signal to a slave camera, the slave camera to capture a second channel of the three-dimensional content.

20. The camera of claim 17, further comprising:
a camera body;
a lens;
a front face of the camera body, the lens positioned at an offset from a center plane of the front of the camera body; and
a communication interface for communicatively coupling the camera to a remote device.

* * * * *